No. 717,232. Patented Dec. 30, 1902.
D. LUBIN.
POWER OPERATED AGRICULTURAL MACHINE.
(Application filed July 22, 1902.)
(No Model.) 2 Sheets—Sheet 1.
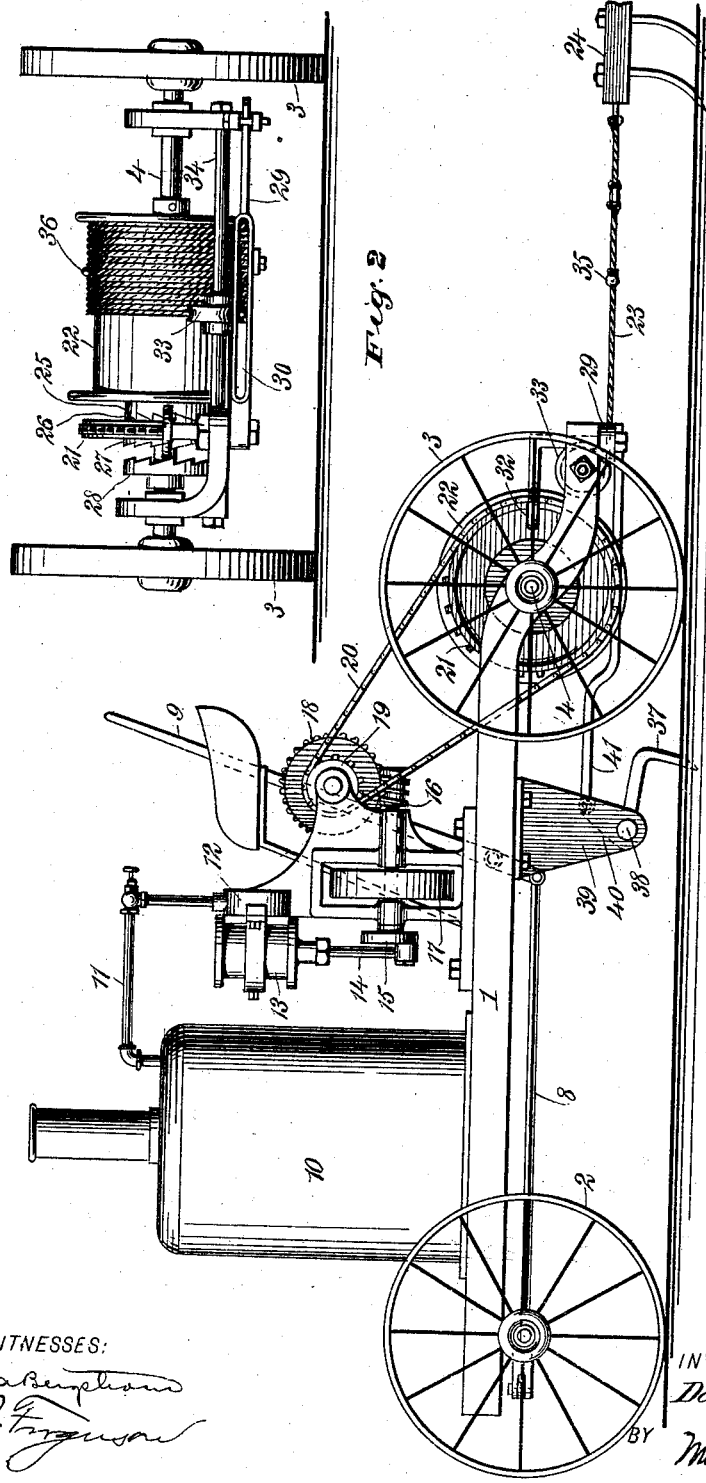
WITNESSES:
INVENTOR
David Lubin
BY
ATTORNEYS.

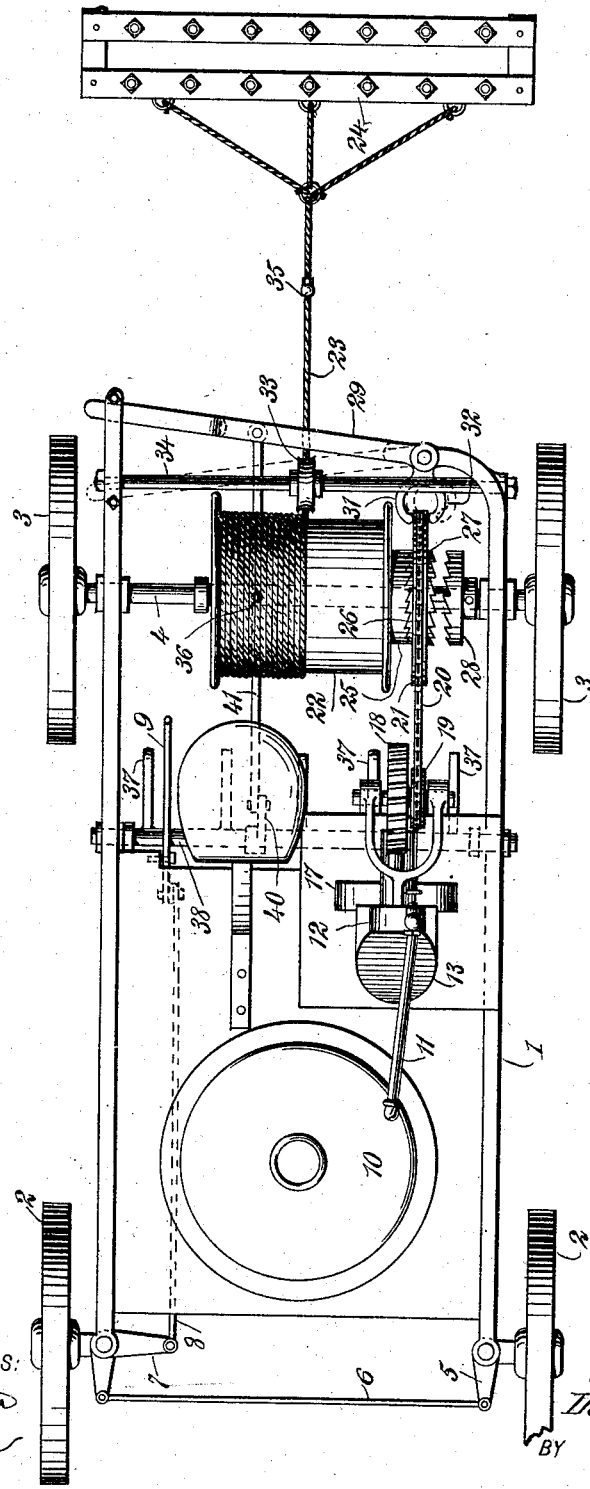

UNITED STATES PATENT OFFICE.

DAVID LUBIN, OF NEW YORK, N. Y.

POWER-OPERATED AGRICULTURAL MACHINE.

SPECIFICATION forming part of Letters Patent No. 717,232, dated December 30, 1902.

Application filed July 22, 1902. Serial No. 116,496. (No model.)

*To all whom it may concern:*

Be it known that I, DAVID LUBIN, a citizen of the United States, and a resident of the city of New York, borough of Manhattan, in the county and State of New York, have invented a new and Improved Power-Operated Agricultural Machine, of which the following is a full, clear, and exact description.

This invention relates to improvements in machines for the fine tillage or cultivation of ground, an object being to provide in connection a motor-driven vehicle and an agricultural tool, the mechanism being so arranged as to alternately move the vehicle and draw the tool along the ground—that is, to move the vehicle a prescribed distance while the tool remains still and then draw the tool up to the vehicle while the vehicle is stationary—thus by division of work making it possible to employ a motor of comparatively low power.

Other objects of the invention will appear in the general description.

I will describe a power-operated agricultural machine embodying my invention and then point out the novel features in the appended claims.

Reference is to be had to the accompanying drawings, forming a part of this specification, in which similar characters of reference indicate corresponding parts in all the figures.

Figure 1 is a side elevation of a power-operated agricultural machine embodying my invention. Fig. 2 is a rear end view thereof, and Fig. 3 is a plan view.

The apparatus comprises a frame 1, mounted on the front wheels 2 and the rear wheels 3. The rear wheels are rigidly connected to the axle 4, which rotates in bearings connected to the frame. The spindles of the front wheels are mounted to turn in bearings, and forwardly-extended arms 5 on the spindles are connected one with the other by means of a rod 6, and from one of the spindles an arm 7 extends inward and has connected to it a draw-rod 8, the rear end of which is pivoted to the lower end of a lever 9. This constitutes a steering mechanism for the vehicle.

Supported on the vehicle is a motor, here shown as a boiler 10, from which a pipe 11 extends to a steam-chest 12 for supplying steam to an oscillating cylinder 13. A piston-stem 14 connects with the crank 15 of a worm-shaft 16, and on this worm-shaft is a balance-wheel 17, that may be also employed as a band-wheel, if desired. The worm of the worm-shaft engages with a worm-wheel 18, on the shaft of which is a sprocket-pinion 19, from which a chain 20 extends to a connection with a sprocket-wheel 21, loosely mounted on the axle 4, so as to move lengthwise thereof. Also loosely mounted on the axle is a winding-drum 22, to which one end of a drawing rope or cable 23 is attached, the other end of said rope or cable being attached to the agricultural tool, which, as here shown, is in the form of a drag 24. It is to be understood, however, that other agricultural tools or implements are designed to be operated by the motor—that is, instead of a drag a plow may be operated, a cultivator may be operated, a seeder may be operated, or any other desired tool. On one end of the winding-drum is a clutch member 25, designed to be engaged by a clutch member 26 on one side of the sprocket-wheel 21, and on the other side of said sprocket-wheel is a clutch member 27, designed for engagement with a clutch member 28, rigidly attached to the axle 4.

Pivoted on the rear end of the frame is a lever 29, provided with a slot 30, through which the rope or cable 23 passes. This lever is provided with fingers 31 32 for engaging opposite sides of the sprocket-wheel 21 for shifting the same, as will be hereinafter described. The rope or cable 23 passes from the winding-drum underneath a grooved pulley 33, movable lengthwise on a rod 34, attached to the frame. This pulley 33 guides the rope or cable as it winds on or unwinds from the drum. The rope or cable is provided near the agricultural tool with a button 35, adapted to engage with the lever 29, and at its opposite end with a button 36, also adapted to engage with the lever for moving it in one direction.

When the vehicle is stationary and the tool is being drawn forward, it may be necessary to anchor the vehicle. Therefore I have provided an automatically-actuated anchor consisting of prongs 37, attached to a rock-shaft 38, mounted in hangers 39, and from an arm 40 on this rock-shaft an actuating-rod 41 extends rearward to a connection with the lever 29.

In Fig. 3 the mechanism is shown as arranged for drawing an agricultural tool toward the vehicle while it is standing still—that is, the clutch member 26 is in engagement with the clutch member 25. When the tool is drawn close to the vehicle, the button 35 by engaging with the lever 29 will move it inward, so that the lever 31 will move the wheel 21 along the axle 4 to engage the clutch member 27 with the clutch member 28. Thus the motor will be put into operative connection with the vehicle, so that the vehicle will move forward while the tool remains stationary. It will be seen that upon said inward movement of the lever 29 the devices 37 will be rocked out of engagement with the ground. When the vehicle shall have moved a predetermined distance—say twenty-five feet, more or less—the button 36 will engage against the inner side of the lever 29, moving it outward to the position indicated in Fig. 3, which will cause the finger 32 to shift the wheel 21, engaging it with the winding-drum, and at the same time the anchoring devices 37 will be forced into the ground. Now the vehicle will remain stationary and the tool drawn forward through or upon the ground. The short pull of approximately twenty-five feet relieves the engine of a great amount of work as compared with devices in which an engine is located at one side of a field and drawing a tool entirely across the field, as by such an arrangement the engine has the extra work of drawing a great length of heavy cable or chain.

When this device or motor is not required for operating agricultural tools, it may be used for a great many other purposes about a farm—that is, it may be used for transporting material from place to place, to operate different kinds of machinery, pulling stumps, drawing logs, or the like.

Having thus described my invention, I claim as new and desire to secure by Letters Patent—

1. In an agricultural device, a vehicle, a motor on the vehicle, an agricultural tool having cable connection with the vehicle, mechanism operated by the motor to alternately move the vehicle and draw the tool and mechanism for automatically shifting the operating connections between the vehicle and drawing device, substantially as specified.

2. In an agricultural device, a vehicle, a motor on the vehicle, a winding-drum on the vehicle, an agricultural tool having a cable connection with the drum, a driving-wheel on the drum-shaft, and means for automatically shifting said wheel to alternate driving connection between the vehicle and drum, substantially as specified.

3. In an agricultural device, a wheeled vehicle, a motor mounted on the vehicle, a drum mounted loosely on the rear axle, a sprocket-wheel operated by the motor and movable lengthwise of the axle, a clutch member on the drum, a clutch member attached to the axle, clutch members on the sprocket-wheel for engaging alternately with said first-named clutch members, a shifting lever for the sprocket-wheel, an agricultural tool, a cable connection between the tool and drum, and devices on said cable for shifting the lever in opposite directions, substantially as specified.

4. In an agricultural device, a vehicle, a motor mounted on the vehicle, a drum loosely mounted on the rear axle of the vehicle, a sprocket-wheel operated by the motor and mounted to slide on the axle, a clutch member on the winding-drum, a clutch member attached to the axle, clutch members on the sprocket-wheel for alternately engaging with the first-named clutch members, a shifting lever for the sprocket-wheel, an agricultural tool, a cable connection between the tool and winding-drum, devices on said cable for shifting the lever in opposite directions, and an anchoring device operated by movements of said lever, substantially as specified.

5. An agricultural tool comprising a vehicle, a motor mounted on the vehicle, a winding-drum loosely mounted on the rear axle of the vehicle, a sprocket-wheel operated by the motor and mounted to slide on said rear axle, a clutch member on the drum, a clutch member fixed to the axle, clutch members on opposite sides of the sprocket-wheel for alternately engaging with the first-named clutch members, a lever, fingers extended from said lever for engaging opposite sides of the sprocket-wheel, a rod extended across the frame of the vehicle, a pulley mounted to slide on said rod, an agricultural tool, a cable connection between said tool and the winding-drum, the said cable being extended around the under side of said pulley, and buttons attached to said cable at oposite sides of the lever, substantially as specified.

In testimony whereof I have signed my name to this specification in the presence of two subscribing witnesses.

DAVID LUBIN.

Witnesses:
WINSLOW N. YORK,
WALTER F. NUTT.